United States Patent [19]

Yamashita

[11] Patent Number: 5,124,738

[45] Date of Patent: Jun. 23, 1992

[54] APPARATUS FOR CORRECTING FOCAL POINT ACCORDING TO LENS TEMPERATURE

[75] Inventor: Koji Yamashita, Kawasaki, Japan

[73] Assignee: Hirakawa Kogyosha Co., Ltd., Tokyo, Japan

[21] Appl. No.: 571,111

[22] Filed: Aug. 23, 1990

[30] Foreign Application Priority Data

Aug. 31, 1989 [JP] Japan .................... 1-225120

[51] Int. Cl.$^5$ .................. G03B 13/36; G03B 27/34
[52] U.S. Cl. ..................... 354/402; 354/167; 355/56
[58] Field of Search ............. 354/400, 402, 167, 403, 354/406, 408; 355/55, 56

[56] References Cited

U.S. PATENT DOCUMENTS

| | | | |
|---|---|---|---|
| 3,625,607 | 12/1971 | Bravenec | 355/56 |
| 4,650,309 | 3/1987 | Ishida et al. | 354/402 |
| 4,772,912 | 9/1988 | Ishida et al. | 354/402 |
| 4,982,216 | 1/1991 | Kudo et al. | 354/400 |

Primary Examiner—Russell E. Adams
Attorney, Agent, or Firm—Oblon, Spivak, McClelland, Maier & Neustadt

[57] ABSTRACT

An apparatus for correcting a focal point according to a lens temperature includes an operation unit, to which data concerning a distance between a focusing lens and an object, data concerning a distance of the focusing lens and a focusing screen, and data concerning a variation of a focal point of the focusing lens per temperature variation are inputted beforehand. When data on a desired magnification are inputted, the operation unit performs arithmetic operations on a focal point at a present temperature. According to the calculated data, adjusting means adjusts distance between the focusing lens and the object, and that between the focusing lens and the focusing screen. As the temperature of the focusing lens further changes, the operation unit continues calculating the variation of the focal point, and another adjusting means adjusts the focal points accordingly.

12 Claims, 2 Drawing Sheets

APPARATUS FOR CORRECTING FOCAL POINT ACCORDING TO LENS TEMPERATURE

BACKGROUND OF THE INVENTION

1. Field of the Invention

This invention relates to an apparatus for correcting a focal point according to a lens temperature in an optical focusing system of a camera such as a process camera, in which a distance between an object and a focusing lens and a distance between the focusing lens and a focusing screen vary only in limited ranges.

In contrast with an ordinary camera, the distance between the focusing lens and the object, and that between the focusing lens and the focusing screen change in very limited ranges in the process camera. Therefore it is possible to figure out, based on arithmetic expressions, the distance between the object and the focusing lens and that between the focusing lens and the focusing screen so as to produce images which are in best focus at a desired magnification, once the focal distance of the focusing lens is known. It is conceivable to develop autofocus units for the process cameras, in which when a desired magnification is inputted, the distances between the object, focusing lens and focusing screen will be automatically calculated and be corrected accordingly in order to produce clear and sharp images at the desired magnification.

The above-mentioned autofocus units differ from those for ordinary cameras. With autofocus units for ordinary cameras, a focusing operation is performed by feeding back focusing data according to an image being focused on the focusing screen. When a focal point exists within depth of focus, the image is considered to be in focus, and so strict focusing precision is not required. However the process camera is required to reproduce clearly and sharply an entire area of the original image in focus. Also, the objects are usually sheet-shaped in the case of the process camera.

The autofocus unit for the process camera mentioned above can assure production of well-focused sharp images. However there has been still some room for improvement in producing much clearer images with such a process camera. For example, the focal point tends to change depending upon temperatures of the focusing lens. To be more specific, as the temperature of the focusing lens varies, the size of the focusing lens itself and that of the lens barrel vary and result in the change of the focal point.

With the ordinary cameras, the autofocus unit performs focusing operation by feeding back focusing data while observing the image focused on the focusing screen. Therefore, the deviation of the focal point due to temperature variations is prevented. However, the autofocus unit for the process camera does not perform any feedback control for the focusing operation, and if the focal point changes depending upon varying temperatures of the focusing lens, this will cause images to be poorly reproduced. Such deterioration of the images becomes serious with the process camera while it is negligible with the ordinary cameras, since images which are considered poor in the field of the process camera would be acceptable as images having sufficient sharpness with the ordinary cameras. Therefore it is desirable to prevent deterioration of the images by some measures so as to obtain clearer images.

SUMMARY OF THE INVENTION

Therefore it is an object of this invention to provide an apparatus, which can correct a focal point according to a lens temperature.

According to this invention there is provided an apparatus for correcting a focal point according to a temperature comprising: a temperature sensor disposed on a focusing lens, an operation unit to which data concerning a distance between a focusing lens and an object at a predetermined magnification, data concerning a distance between the focusing lens and a focusing screen, and data concerning a variation of a focal distance per temperature variation of the focusing lens are inputted beforehand, and which is capable of calculating a focal point of the focusing lens at an actual temperature according to the already inputted data and temperature data inputted from said temperature sensor; and adjusting means for adjusting a distance between the focusing lens and the object and a distance between the focusing lens and the focusing screen according to the focal point calculated by the operation unit.

With this arrangement, the operation unit calculates a variation of the focal point depending upon the temperature of the focusing lens and causes the adjusting means to adjust a deviation of the focal point according to the calculated results.

The above and other advantages, features and additional objects of this invention will be manifest to those versed in the art upon making reference to the following detailed description and the accompanying drawings in which the principles of this invention are shown by way of illustrative example.

DETAILED DESCRIPTION

Figure 1:
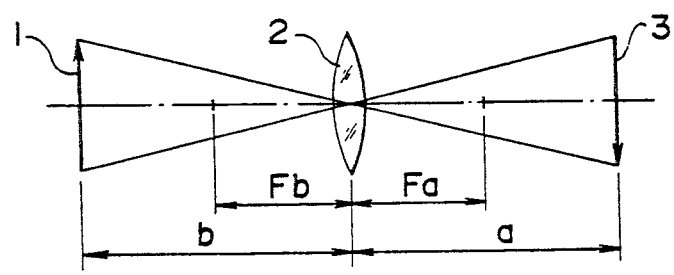
FIG. 1 is a schematic view of an optical system to which an apparatus according to the present invention is applicable.

First, the relation between the temperature of the focusing lens and the focal distance is measured and calculated. In FIG. 1, reference numeral 1 stands for an object; 2: a focusing lens; and 3: a focusing screen. Legend b represents the distance between the focusing lens 2 and the object 1; a: the distance between the focusing lens 2 and the focusing screen 3; Fb: focal distance at the object side of the focusing lens 2, and Fa: the focal distance at the focusing screen side of the focusing lens 2.

The distances between the object 1, focusing lens 2 and focusing screen 3 are measured at a certain lens temperature at about 100% magnification and about 120% magnification. Variations of the focal distance of the focusing lens 2 according to temperatures will then be calculated. Since there is some difference between the nominal value of the focal distance of the focusing lens 2 and the actual focal distance, it is necessary to determine the actual and precise focal distance of the focusing lens 2. The data thus obtained are:

$R_{100}$: Actual magnification used for measurement at about 100% magnification $a_{100}$: Data on the distance between the focusing screen and the focusing lens at $R_{100}$;

$b_{100}$: Data on the distance between the focusing lens and the object for $R_{100}$;

$R_{120}$: Actual magnification used for measurement at about 120% magnification;

$a_{120}$: Data on the distance between the focusing screen and the focusing lens at $R_{120}$;

$b_{120}$: Data on the distance between the focusing lens and the object at $R_{120}$.

The data $a_{100}$, $b_{100}$, $a_{120}$, and $b_{120}$ are not always required to be the precise distances between the object, focusing lens and focusing screen, but they should show the accurate differences of the distances between at 100% magnification and 120% magnification. From the foregoing, variation Fa of the focal distance at the focusing screen side of the focusing lens and variation Fb of the focal distance at the object side are respectively calculated using the following expressions.

$$Fa = (a_{120} - a_{100}) \div (R_{120} - R_{100}) \quad (1)$$

$$Fb = (b_{120} - b_{100}) \div \{(1/R_{120}) - (1/R_{100})\} \quad (2)$$

The variations Fa and Fb are calculated for different lens temperatures, and the relationship between the focal distances of the lens and the temperature will be determined. The variation of the focal distance ΔF per °C. is then calculated. The variation ΔF thus obtained is peculiar to the measured lens. However, since the lenses of the same kind have similar values, of which focusing differences are negligible, the variation ΔF thus obtained is applicable to the lenses of the same kind.

Next, focusing operation is performed within the magnification range 70% to 120% of the camera, for example, at three magnifications of 70%, 100% and 120%. Data are collected concerning actual magnifications, lens temperatures T, and distances between the focusing lens and the focusing screen and the object. The collected data are:

$R_{70}$: Actual magnification at which an image is focused at about 70% magnification $a_{70}$: Distance between the focusing screen and the focusing lens at $R_{70}$ $b_{70}$: Distance between the focusing lens and the object at $R_{70}$.

In this case, $a_{70}$ and $b_{70}$ are not required to be strictly precise but are acceptable if they can show the accurate differences between the magnifications of 70% and 100%. The expressions (1) and (2) are used to calculate, based on these data, the variations of the focal distance Fa at the focusing screen side of the focusing lens and the variation Fb of the focal distance at the object side of the focusing lens at 70% magnification and those at 100% magnification, respectively. In addition, the variation of the focal distance ΔF per °C. is calculated as mentioned previously.

Then the distances Fa and Fb at the temperature T are determined for the magnifications of 70% to 100% and for the magnifications of 100% to 120%. A total of four kinds of data on the focal distances can be obtained. The reason to collect so detailed data is to assure the image having high resolution at the periphery thereof at a wide field of view. Otherwise, data on one kind of the focal distance will be enough if images are produced at a narrow field of view. The focal distances and constants are assumed as follows.

Fal: Focal distance between the focusing screen and the focusing lens at 70% to 100% magnification Kal: Constant Fbl: Focal distance between the focusing lens and the object at 70% to 100% magnification Kbl: Constant Fah: Focal distance between the focusing screen and the focusing lens at 100% to 120% magnification Kah: Constant Fbh: Focal distance between the focusing lens and the object at 100% to 120% magnification Kbh: Constant The focal distances and constants are calculated by the following expressions.

$$Fal = (a_{100} - a_{70}) \div (R_{100} - R_{70})$$

$$Kal = a_{70} - (1 + R_{70}) \times Fal$$

$$Fbl = (b_{100} - b_{70}) \div \{(1/R_{100}) - (1/R_{70})\}$$

$$Kbl = b_{70} - \{1 + (1/R_{70})\} \times Fbl$$

$$Fah = (a_{120} - a_{100}) \div (R_{120} - R_{100})$$

$$Kah = a_{120} - (1 + R_{120}) \times Fah$$

$$Fbh = (b_{120} - b_{100}) \div ((1/R_{120}) - (1/R_{100}))$$

$$Kbh = b_{120} - \{1 + (1/R_{120})\} \times Fbh$$

The calculated values are stored in a recording medium such as a diskette together with the temperature T and the variations ΔF of the focal distances per °C.

The stored data will be used to correct the focal point according to the lens temperatures. When the camera control program is started, the apparatus of this invention reads the focusing data from the recording medium, and performs the focusing operation based on the inputted magnification data. The focusing operation is carried out according to the following expression.

$$a = (1 + R) \times F \quad (3)$$

$$b = \{1 + (1/R)\} \times F \quad (4)$$

where a: a distance between the focusing lens and the focusing screen; b: a distance between the object and the focusing lens; R: a magnification; and F: a focal distance.

In an actual control program, the legend a represents the distance between the focusing screen and a certain reference point, and the legend b respresents the distance between the object and another certain reference point. In addition, since different values are applied as focal distances in front of and in the rear of the focusing lens, the expressions (3) and (4) will be:

$$a = (1 + R) \times Fa + Ka \quad (5)$$

$$b = \{1 + (1/R)\} \times Fb + Kb \quad (6)$$

where Fa: the focal distance on the focusing screen side of the focusing lens; Fb: the focal distance on the object side of the focusing lens; and Ka and Kb: constants.

The focusing operation is performed according to the calculation based on the expressions (5) and (6). Since the focal points of the focusing lens vary depending on the temperatures as described above, the variation of the focal points is corrected by the following expressions.

$$a = (1+R) \times \{Fa + \Delta F \times (Tn-T)\} + Ka \quad (7)$$

$$b = \{1+(1/R)\} \times \{Fb + \Delta F \times (Tn-T)\} + Kb \quad (8)$$

where Tn: a present temperature of the focusing lens; ΔF: variation of the focal point per °C.

In order to adjust the focal distance at the actual temperature, "ΔF×(Tn−T)" is added to the focal distance F in the focusing data at the temperature T.

Now the expressions (7) and (8) are calculated by putting actual focusing data, i.e., a magnification Rl (between 70% and 100%), and a present lens temperature Tn. The focal distance and constant are those for the magnification from 70% to 100%.

$$a = (1+Rl) \times \{Fal + \Delta F \times (Tn-T)\} + Kal$$

$$b = \{1+(1/Rl)\} \times \{Fbl + \Delta F \times (Tn-T)\} + Kbl$$

The expressions (7) and (8) will be as follows when applying the magnification Rh (between 100% and 120%), an actual temperature Tn, and the focal distance and constant for 100% to 120% magnification.

$$a = (1+Rh) \times \{Fah + \Delta F \times (Tn-T)\} + Kah$$

$$b = \{1+(1/Rh)\} \times \{Fbh + \Delta F \times (Tn-T)\} + Kbh$$

By the aforementioned calculations, not only the focal point will be determined according to the inputted magnification data but also the focal point corrected depending upon the lens temperature will be determined. Then the position of the object, focusing lens and the focusing screen will be corrected according to the calculated results, so that clear and sharp images will be produced at the optimum focal point which is adjusted according to the lens temperature at a given moment.

Figure 2:
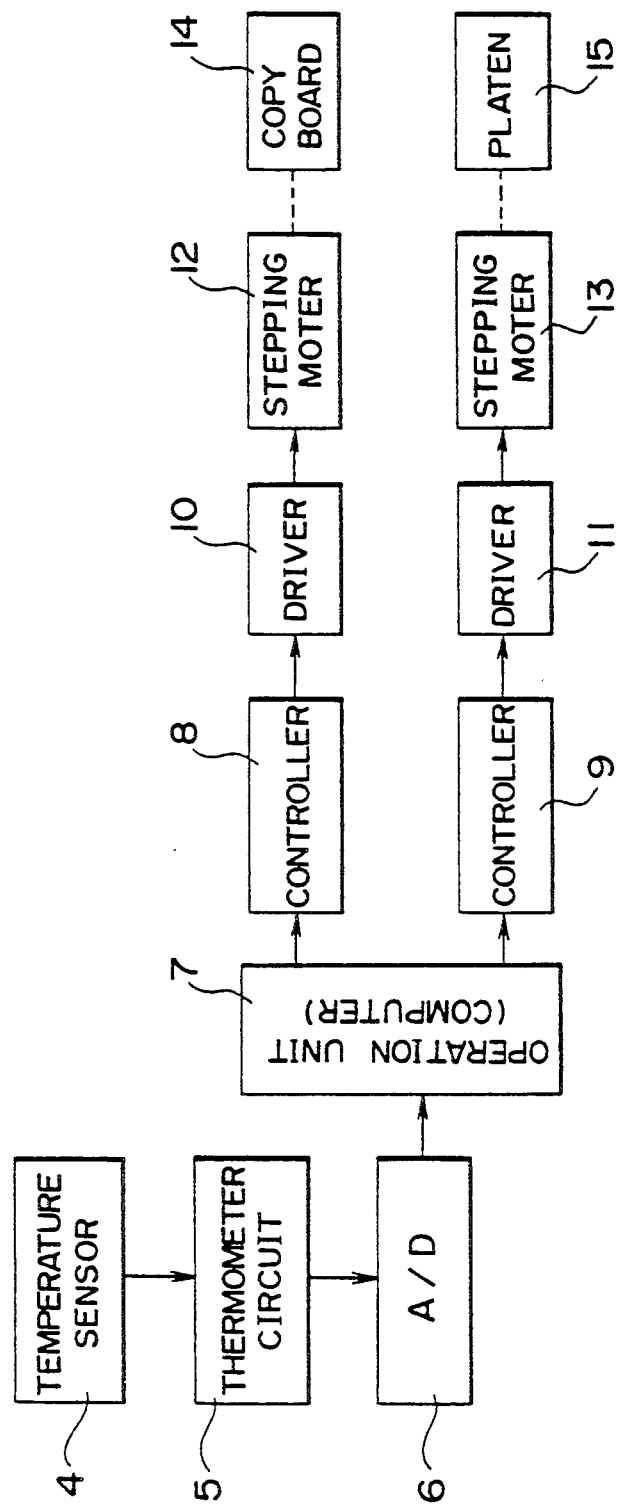
FIG. 2 is a block diagram showing an apparatus for correcting a focal point according to a lens temperature in one embodiment of this invention.

Operation of the apparatus in an embodiment applied to a process camera will be described with reference to FIG. 2. As shown in FIG. 2, a temperature sensor 4 is disposed in a lens barrel of a focusing lens 2 and detects a temperature of the focusing lens 2. A detection signal from the temperature sensor 4 is fed via a thermometer circuit 5 to an analog/digital converter 6, which converts the signal into a digital signal. The digital signal is then inputted into an operation unit 7.

Figure 3:
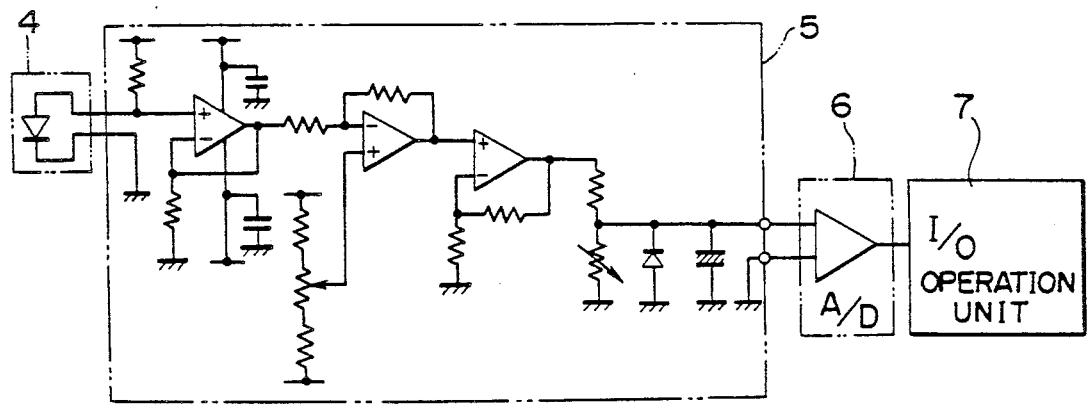
FIG. 3 is a diagram showing an example of a circuit which can be used in the device according to this invention.

FIG. 3 shows the thermometer circuit 5 in detail, which is mainly composed of amplifier circuits.

The operation unit 7 shown in FIG. 2 is composed of a personal computer, and performs arithmetic operations of the focal point at the designated magnification and the variations of the focal point according to the temperatures of the focusing lens, based on the data concerning the distance between the focusing lens and the object at a predetermined magnification, the data concerning the distance between the focusing lens and the focusing screen, the data concerning the focal distance of the focusing lens, and the data concerning the variation of the focal distance of the focusing lens according to the temperatures.

According to the focal point on the object side calculated by the operation unit 7, adjusting means including a controller 8, a driver 10 and a stepping motor 12 is started to have a copyboard 14 moved in the optical axis direction. The copyboard 14 holds thereon a manuscript as the object. The focal point on the object side is adjusted following the movement of the copyboard 14. Another adjusting means including a controller 9, a driver 11 and a stepping motor 13 is also started to cause a platen 15 to be moved in the optical axis direction according to the focal point on the focusing screen side calculated by the operation unit 7. The platen 15 retains a photosensitive member thereon. The focal point on the focusing screen side is adjusted following the movement of the platen 15. The stepping motor 12 and the copyboard 14 are connected by such means as a ball screw, and the stepping motor 13 and the copyboard 15 are connected also by a ball screw, for example. When the ball screws are rotated by the stepping motors, both the copyboard 14 and the platen 15 are moved in the optical axis direction.

The temperature sensor 4 detects a temperature variation in the focusing lens, and generates a detection signal. The detection signal is converted into a digital signal, and is inputted to the operation unit 7. The operation unit 7 calculates a variation of the focal point depending upon the temperature variation. Then the adjusting means moves the copyboard 14 and the platen 15 according to the calculated results so that an optimum focal point can be determined so as to produce well-focused clear images without fail.

In a further embodiment of this invention, the copyboard may be stationary while both the focusing lens and the platen may be movable. Otherwise, the platen may be stationary, while both the focusing lens and the copyboard may be movable. In addition, it is possible that a mirror is slantingly disposed between the copyboard and the focusing lens so as to bend the optical path, and change the distance of the optical path by moving the mirror.

What is claimed is:

1. An apparatus for use in an optical system for correcting a focal point according to a lens temperature comprising:

(a) a temperature sensor disposed on a focusing lens,
    (b) an operation unit to which data concerning a distance between a focusing lens and an object at a predetermined magnification, data concerning a distance between the focusing lens and a focusing screen, and data concerning a variation of a focal distance per temperature variation of the focusing lens are inputted beforehand, said operation unit calculating a focal point of the focusing lens at an actual temperature according to the inputted distance data and temperature data inputted from said temperature sensor; and
    (c) adjusting means for adjusting a distance between the focusing lens and the object and a distance between the focusing lens and the focusing screen according to the focal point calculated by said operation unit.

2. A focal point correcting apparatus according to claim 1, wherein said operation unit calculates a variation of the focal point depending upon the temperature of the focusing lens and causes said adjusting means to adjust a change of the focal point according to the calculated results.

3. A focal point correcting apparatus according to claim 1, wherein said adjusting means includes a stepping motor.

4. A focal point correcting apparatus according to claim 1 wherein the apparatus is used in a process camera which has a copy board upon which said object is placed.

5. A focal point correcting apparatus according to claim 4 wherein the object is a sheet-shaped material.

6. A focal point correcting apparatus according to claim 4 wherein said process camera has a platen upon which said focusing screen is placed.

7. The focal point correcting apparatus according to claim 6 wherein said focusing screen is a photosensitive member.

8. A focal point correcting apparatus according to claim 1 wherein said adjusting means moves at least one of said object, said focusing screen and said focusing lens so that said focusing lens is disposed between said object and said focusing screen at said calculated focal point.

9. A focal point correcting apparatus according to claim 6 wherein said calculated focal point is the point at which said focusing lens creates a focused image of said object on said focusing screen.

10. A focal point correcting apparatus according to claim 6 wherein said focusing lens and said focusing screen are each moved a variable distance so that said focusing lens is disposed between said object and said focusing screen at said calculated focal point where an image of said object is in focus on said focusing screen.

11. A focal point correcting apparatus according to claim 6 wherein said focusing lens and said object are each moved a variable distance so that said focusing lens is disposed between said object and said focusing screen at said calculated focal points where an image of said object is in focus on said focusing screen.

12. A focal point correcting apparatus according to claim 1 wherein said distance between the focusing lens and the object and said distance between said focusing lens and said focusing screen vary only in limited ranges.

* * * * *